(12) United States Patent
Sanderson et al.

(10) Patent No.: US 10,647,070 B2
(45) Date of Patent: May 12, 2020

(54) OBJECT PRODUCTION

(71) Applicant: BAE Systems plc, London (GB)

(72) Inventors: Steven Neil Sanderson, Balderstone (GB); Vanessa Germaine Bickerstaff, Balderstone (GB)

(73) Assignee: BAE Systems plc, London (GB)

( * ) Notice: Subject to any disclaimer, the term of this patent is extended or adjusted under 35 U.S.C. 154(b) by 268 days.

(21) Appl. No.: 15/527,082

(22) PCT Filed: Nov. 17, 2015

(86) PCT No.: PCT/GB2015/053477
§ 371 (c)(1),
(2) Date: May 16, 2017

(87) PCT Pub. No.: WO2016/079490
PCT Pub. Date: May 26, 2016

(65) Prior Publication Data
US 2018/0194085 A1      Jul. 12, 2018

(30) Foreign Application Priority Data
Nov. 19, 2014   (GB) .................................. 1420539.7

(51) Int. Cl.
*B29C 70/54*      (2006.01)
*B29C 70/30*      (2006.01)
(Continued)

(52) U.S. Cl.
CPC .............. *B29C 70/545* (2013.01); *B23C 3/13* (2013.01); *B23Q 15/007* (2013.01); *B29C 70/30* (2013.01);
(Continued)

(58) Field of Classification Search
CPC .................. B29C 70/545; B29C 70/30; B29C 2793/0054; B64C 3/26
See application file for complete search history.

(56) References Cited

U.S. PATENT DOCUMENTS

| | | |
|---|---|---|
| 4,196,522 A | 4/1980 | Bell et al. |
| 4,492,607 A | 1/1985 | Halcomb |
| (Continued) | | |

FOREIGN PATENT DOCUMENTS

| | | |
|---|---|---|
| DE | 19900950 C1 | 5/2000 |
| EP | 1139189 A2 | 10/2001 |
| (Continued) | | |

OTHER PUBLICATIONS

Great Britain Search Report under Sections 17 of Application No. GB1407186.4, dated Aug. 20, 2014, 3 pages.
(Continued)

*Primary Examiner* — Mark A Osele
*Assistant Examiner* — Christopher C Caillouet
(74) *Attorney, Agent, or Firm* — Maine Cernota & Rardin

(57) ABSTRACT

Producing an object (2), comprising: providing a tool (10) having a mould surface (14); applying uncured composite material (12) to the mould surface (14) to form an assembly (8); curing the assembly (8) to produce cured composite material (12') having a surface (16') the same shape as the mould surface (14); providing a digital model (24) of the object (2) specifying a first surface (4) and a second surface (6) of the object (2), the first surface (4) being the same shape as the mould surface (14); and, while the cured composite material (12') is held against the mould surface (14), machining, using the digital model (24), a further surface (18') of the cured composite material (12') such that it has the same shape as the second surface (6) and the same (Continued)

position relative to the mould surface (14) as the second surface (6) relative to the first surface (4).

11 Claims, 2 Drawing Sheets

(51) Int. Cl.
| | | |
|---|---|---|
| B29C 70/44 | (2006.01) | |
| B23C 3/13 | (2006.01) | |
| B23Q 15/007 | (2006.01) | |
| B64C 1/12 | (2006.01) | |
| B64C 3/26 | (2006.01) | |
| B29K 105/08 | (2006.01) | |
| B29L 31/30 | (2006.01) | |
| B64C 1/00 | (2006.01) | |

(52) U.S. Cl.
CPC ............... *B29C 70/44* (2013.01); *B64C 1/12* (2013.01); *B64C 3/26* (2013.01); *B29C 70/541* (2013.01); *B29C 2793/009* (2013.01); *B29C 2793/0054* (2013.01); *B29K 2105/0872* (2013.01); *B29L 2031/3076* (2013.01); *B64C 2001/0072* (2013.01)

(56) References Cited

U.S. PATENT DOCUMENTS

| | | | |
|---|---|---|---|
| 4,783,228 | A | 11/1988 | Aker |
| 494,588 | A | 7/1990 | Carver et al. |
| 4,945,488 | A | 7/1990 | Carver et al. |
| 5,615,483 | A | 4/1997 | Micale |
| 5,806,797 | A | 9/1998 | Micale |
| 5,910,894 | A | 6/1999 | Pryor |
| 6,519,860 | B1 | 2/2003 | Bieg |
| 6,613,258 | B1 | 9/2003 | Maison |
| 6,692,681 | B1 | 2/2004 | Lunde |
| 8,088,317 | B1 | 1/2012 | Karem |
| 8,620,470 | B2 | 12/2013 | Cobb |
| 9,199,417 | B1 | 12/2015 | Rotter |
| 9,651,935 | B2 | 5/2017 | Stone |
| 9,889,949 | B2 | 2/2018 | Cookson |
| 2002/0133252 | A1 | 9/2002 | Landers |
| 2004/0039465 | A1 | 2/2004 | Boyer |
| 2004/0093731 | A1 | 5/2004 | Sarh |
| 2004/0217497 | A1* | 11/2004 | Engwall ............... B29C 70/545 264/40.1 |
| 2006/0108058 | A1 | 5/2006 | Chapman |
| 2006/0225265 | A1 | 10/2006 | Burnett et al. |
| 2007/0222122 | A1 | 9/2007 | Ong |
| 2008/0134505 | A1 | 6/2008 | Gabriel et al. |
| 2008/0246175 | A1 | 10/2008 | Biornstad |
| 2009/0145545 | A1 | 6/2009 | Brennan |
| 2010/0059169 | A1 | 3/2010 | Lengsfeld |
| 2010/0068450 | A1 | 3/2010 | Lloyd |
| 2010/0170996 | A1 | 7/2010 | Sankaran |
| 2010/0269979 | A1 | 10/2010 | Abitz |
| 2011/0156304 | A1 | 6/2011 | Walker et al. |
| 2012/0168561 | A1 | 7/2012 | Salmon |
| 2012/0219764 | A1 | 8/2012 | Biornstad et al. |
| 2012/0239181 | A1 | 9/2012 | Gu et al. |
| 2013/0000815 | A1 | 1/2013 | Barlag |
| 2013/0117983 | A1 | 5/2013 | Sana et al. |
| 2013/0130016 | A1 | 5/2013 | Hodgson et al. |
| 2013/0019446 | A1 | 6/2013 | Venskus |
| 2014/0059856 | A1 | 3/2014 | Simmons |
| 2015/0203185 | A1 | 7/2015 | Rosman |
| 2015/0225063 | A1 | 8/2015 | Littell |

FOREIGN PATENT DOCUMENTS

| | | |
|---|---|---|
| EP | 1230124 B1 | 12/2005 |
| EP | 1952972 A1 | 6/2008 |
| EP | 2772427 A1 | 3/2014 |
| EP | 2703919 A2 | 5/2014 |
| FR | 2788743 A1 | 7/2000 |
| GB | 2350809 A | 12/2000 |
| GB | 2441226 A | 2/2008 |
| WO | 199850180 A | 11/1998 |
| WO | 0136270 A1 | 5/2001 |
| WO | 20010036270 A1 | 5/2001 |
| WO | 2014046783 A1 | 3/2014 |

OTHER PUBLICATIONS

Great Britain Combined Search and Examination Report under Sections 17 and 18(3) of Application No. GB1506734.1, dated Oct. 21, 2015, 5 pages.
International Search Report and Written Opinion of Application No. GB/2015/051090, dated Oct. 25, 2016, 8 pages.
International Search Report and Written Opinion of Application No. GB/2015/051091, dated Oct. 25, 2016, 9 pages.
International Search Report and Written Opinion of Application No. GB/2015/051092, dated Oct. 25, 2016, 9 pages.
International Search Report and Written Opinion of Application No. GB/2015/051111, dated Oct. 25, 2016, 8 pages.
International Search Report and Written Opinion of Application No. GB/2015/051179, dated Oct. 25, 2016, 9 pages.
Scott, Harold A. "Modeling aircraft assembly operations". Simulation Conference Proceedings, 1994. Winter. IEEE, 1994 pp. 920-927 (Year 1994).
Deo, Ravi B., James H. Starnes, and Richard C. Holzwarth. "Low-cost composite materials and structures for aircraft applications". NATO RTO AVT Panel spring symposium and specialists meeting Loen, Norway. 2001. pp. 1-12 (Year 2001).
Hartlyey; Keith. "The learning curve and its application to the aircraft industry". The Journal of Industrial Economics (1965): pp. 122-128. (Year 1965).
International Search Report and Written Opinion of PCT Application No. PCT/GB2015/053477, dated Mar. 7, 2016, 12 pages.
International Preliminary Report on Patentabiity of International Application No. PCT/GB2015/053477, dated May 23, 2017, 8 pages.
Great Britain Combined Search and Examination Report under Section 17 and 18(3) of Application No. GB1506075.9, dated Sep. 27, 2015, 6 pages.
Great Britain Search Report under Section 17(5) of Application No. GB1407185.6, dated Oct. 29, 2014, 4 pages.
International Search Report and Written Opinion of Application No. PCT/GB2015051091, dated Feb. 19, 2016, 12 pages.
International Search Report of Application No. PCT/GB2015/051090, dated Oct. 12, 2015, 3 pages.
Great Britain Search Report under Section 17(5) of Application No. GB1407184.9, dated Nov. 26, 2014, 3 pages.
Great Britain Search Report under Section 17 of Application No. GB1506074.2, dated Sep. 9, 2015, 3 pages.
Great Britain Search Report under Section 17(5) of Application No. GB1407186.4, dated Aug. 20, 2014, 3 pages.
Great Britain Combined Search and Examination Report under Sections 17 and 18(3) of Application No. GB1506076.7, dated Aug. 21, 2015, 5 pages.
International Search Report and Written Opinion of Application No. PCT/GB2015/051092, dated Apr. 4, 2016, 12 pages.
Great Britain Search Report under Section 17(5) of Application No. GB1407181.5, dated Oct. 29, 2014, 5 pages.
Great Britain Combined Search and Examination Report under Sections 17 and 18(3) of Application GB1506078.3, dated Sep. 29, 2015, 5 pages.
International Preliminary Report on Patentability of Application No. PCTGB2015051095, dated Jan. 8, 2016, 7 pages.
International Search Report and Written Opinion of Application No. PCTGB2015051095, dated Oct. 5, 2015, 9 pages.
Great Britain Search Report under Section 17(5) of Application No. GB1407183.1, dated Oct. 15, 2014, 3 pages.
International Search Report and Written Opinion of Application No. PCTGB2015051110, dated Sep. 29, 2016, 10 pages.

(56) References Cited

OTHER PUBLICATIONS

Great Britain Combined Search and Examination Report under Section 17 and 18(3) of Application No. GB1506205.2, dated Sep. 30, 2015, 6 pages.
International Preliminary Report on Patentability of Application No. PCTGB2015051110, dated Sep. 13, 2016, 7 pages.
Great Britain Search Report under Section 17(5) of Application No. GB1420539.7, dated Apr. 29, 2015, 3 pages.
Great Britain Search Report under Section 17(5) of Application No. GB1500973.1, dated Mar. 2, 2015, 3 pages.
International Search Report and Written Opinion of Application No. GB/2015/051179, dated Apr. 15, 2016, 12 pages.
International Search Report and Written Opinion of Application No. PCT/GB2015/051111, dated Feb. 23, 2016, 11 pages.
Great Britain Combined Search and Examination Report under Sections 17 and 18(3) of Application No. GB1506207.8, dated Oct. 1, 2015, 5 pages.
Great Britain Search Report under Section 17(5) of Application No. GB1500946.7, dated Mar. 3, 215, 5 pages.

\* cited by examiner

US 10,647,070 B2

OBJECT PRODUCTION

RELATED APPLICATIONS

This application is a national phase application filed under 35 U.S.C. § 371 of PCT Application No. PCT/GB2015/053477 with an International filing date of Nov. 17, 2015 which claims priority of GB Patent Application 1420539.7 filed Nov. 19, 2014. Each of these applications is herein incorporated by reference in its entirety for all purposes.

FIELD OF THE INVENTION

The present invention relates to the production of objects, in particular, objects made of composite materials.

BACKGROUND

The external skins of many aircraft are formed from a number of panels made of a composite material. This composite material may be a polymer matrix reinforced with fibres such as carbon or glass fibres.

Typically, aircraft panels are produced by curing layers of composite material to produce an initial aircraft panel. The initial aircraft panel is then inspected and further layers of composite material are added to the initial aircraft panel where additional thickness is required. The initial panel and added layers are re-cured to produce a modified aircraft panel. This process of inspection, adding additional layers of composite material, and re-curing is iteratively performed until the aircraft panel is as desired. This production process tends to be imprecise and time-consuming due, at least in part, to the unpredictability of the amount by which the thickness of a layer of composite material varies during curing.

Many conventionally produced aircraft panels do not conform to the shape of an aircraft airframe to which they are to be attached. Filler material, for example liquid shim, may have to be applied to fill gaps between the aircraft panel and the airframe. This is typically a time-consuming and costly process, and may add considerable excess weight to an aircraft.

SUMMARY OF THE INVENTION

The present inventors have realised that problems caused by the unpredictability of the size-variation of composite materials during curing may be avoided by the implementation of a subtractive manufacturing process.

In a first aspect, the present invention provides a method of producing an object, the method comprising: providing a mould tool having a mould surface; applying uncured composite material to the mould surface of the mould tool so as to form an assembly; curing the assembly so as to cure the composite material and mould the composite material against the mould surface, thereby producing cured composite material having a surface that is substantially the same shape as and contiguous with the mould surface; providing a digital model of at least part of the object to be produced, wherein the model specifies a first surface of the object to be produced, a second surface of the object to be produced, and a position of the second surface relative to the first surface; and the first surface is substantially the same shape as the mould surface; and while maintaining the position of the cured composite material relative to the mould surface (i.e. while retaining the cured composite material against the mould surface of the mould tool in such a way that the surface of the cured composite material that is substantially the same shape the mould surface is contiguous with the mould surface), machining, by a router, using the digital model, a further surface of the cured composite material, thereby producing the object. The cured composite material is machined in such a way that: the further surface of the cured composite material is substantially the same shape as the second surface, and the position of the further surface of the cured composite material relative to the mould surface is substantially the same as the position of the second surface relative to the first surface.

The object may be an aircraft panel for forming at an external skin of at least part of an aircraft.

The first surface may be an outer mould line of the at least part of the aircraft.

The second surface may be an inner mould line of the at least part of the aircraft.

The step of machining may comprise: measuring a location of the mould surface of the mould tool; defining, as a datum, the measured location of the mould surface; locating the router against at least part of the mould tool, thereby moving the router into a known position with respect to the datum; and controlling the router with respect to the datum to machine the cured composite material.

The step of machining may comprise defining a location of the first surface of the digital model to be at the datum, thereby specifying a location of the second surface relative to the datum.

The mould tool may comprise a plurality tooling balls, each tooling ball having a fixed position relative to the mould surface. The step of measuring a location of the mould surface may comprise measuring relative locations of the tooling balls. The step of locating the router against at least part of the mould tool may comprise locating the router against a tooling ball.

The uncured composite material may be a plurality of pre-impregnated sheets comprising composite fibres and a matrix material.

The method may further comprise, during the curing of the assembly, forcing the composite material against the mould surface of the mould tool by applying a membrane over a surface of the assembly such that the composite material is sandwiched between the mould tool and the membrane, and establishing a vacuum within a chamber defined by the membrane and the mould tool.

During the machining of the cured composite material, the cured composite material may be retained against the mould tool by retaining means selected from the group of retaining means consisting of: one or more clamps; adhesive; a vacuum established between the mould tool and the cured composite material.

The mould tool may have substantially the same thermal expansion properties as the composite material.

In a further aspect, the present invention provides an object produced using a method according to the preceding aspect.

The object may be an aircraft panel for forming at an external skin of at least part of an aircraft.

In a further aspect, the present invention provides an aircraft comprising an aircraft panel according to the preceding aspect.

In a further aspect, the present invention provides a system for producing an object, the system comprising: a mould tool having a mould surface; curing apparatus; one or more processors; and a router. The curing apparatus is configured to cure an assembly, the assembly comprising the mould tool and uncured composite material applied to the mould surface of the mould tool, such that the composite material is cured and moulded against the mould surface, thereby producing cured composite material having a surface that is substantially the same shape as and contiguous with the mould surface. The one or more processors are configured to provide a digital model of at least part of the object to be produced, the model specifying a first surface of the object to be produced, a second surface of the object to be produced, and a position of the second surface relative to the first surface, and the first surface being substantially the same shape as the mould surface. The router is configured to, while the cured composite material is being retained against the mould surface of the mould tool in such a way that the surface of the cured composite material that is substantially the same shape the mould surface is contiguous with the mould surface, in accordance with the digital model, machine a further surface of the cured composite material in such a way that: the further surface of the cured composite material is substantially the same shape as the second surface; and the position of the further surface of the cured composite material relative to the mould surface is substantially the same as the position of the second surface relative to the first surface.

DETAILED DESCRIPTION

Figure 1:
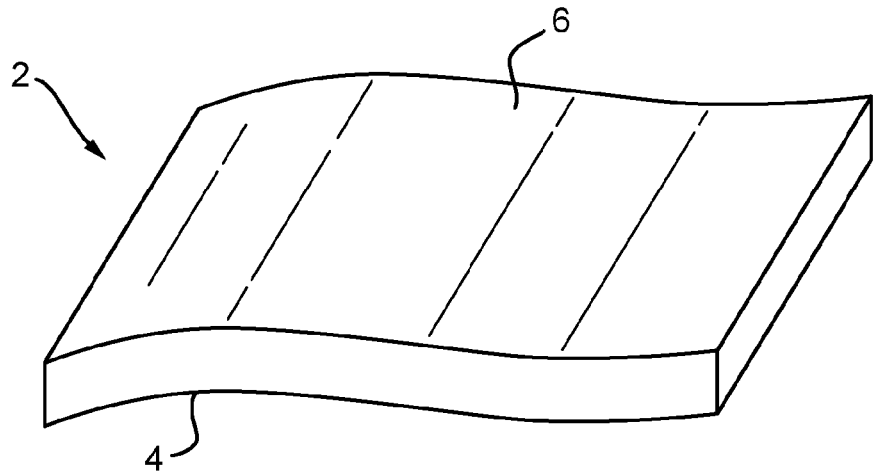
FIG. 1 is a schematic illustration (not to scale) of an example of an aircraft panel.

In the following description, like reference numerals refer to like elements.

The following description is based on embodiments of the invention and should not be taken as limiting the invention with regard to alternative embodiments that are not explicitly described herein.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an example of an aircraft panel 2 to be produced using a production process. An embodiment of the production process is described in more detail later below with reference to FIG. 2.

The aircraft panel 2 is made of a composite material in particular a carbon fibre-reinforced polymer, i.e. a polymer matrix reinforced with carbon fibres.

The aircraft panel 2 may be of any appropriate size.

The aircraft panel 2 comprises a lower surface 4 and an upper surface 6 opposite to the lower surface 4.

In this embodiment, the aircraft panel 2 is to be attached to an aircraft substructure or airframe so as to provide part of an aircraft. The aircraft panel 2 forms an external skin of the part of the aircraft. The aircraft panel 2 is to be attached to the airframe such that the lower surface 4 of the aircraft panel 2 is in contact with an external surface of the airframe.

The lower surface 4 of the aircraft panel 2 (and the external surface of the airframe) is an inner mould line (IML) of the part of an aircraft. The upper surface 6 of the aircraft panel 2 is an outer mould line (OML) of the part of the aircraft. The OML defined by the upper surface 6 is to be within a pre-specified tolerance of a desired OML (which may be specified, for example, in a digital model of the aircraft part).

The OML having the required tolerance tends to be provided by the IML of the aircraft part being within a pre-specified tolerance of a desired IML (which may be specified by the aforementioned digital model).

Also, the OML having the required tolerance tends to be provided by the lower surface 4 of the aircraft panel 2 having the same shape as, or at least being within a predetermined tolerance of, the external surface of the airframe.

Figure 2:
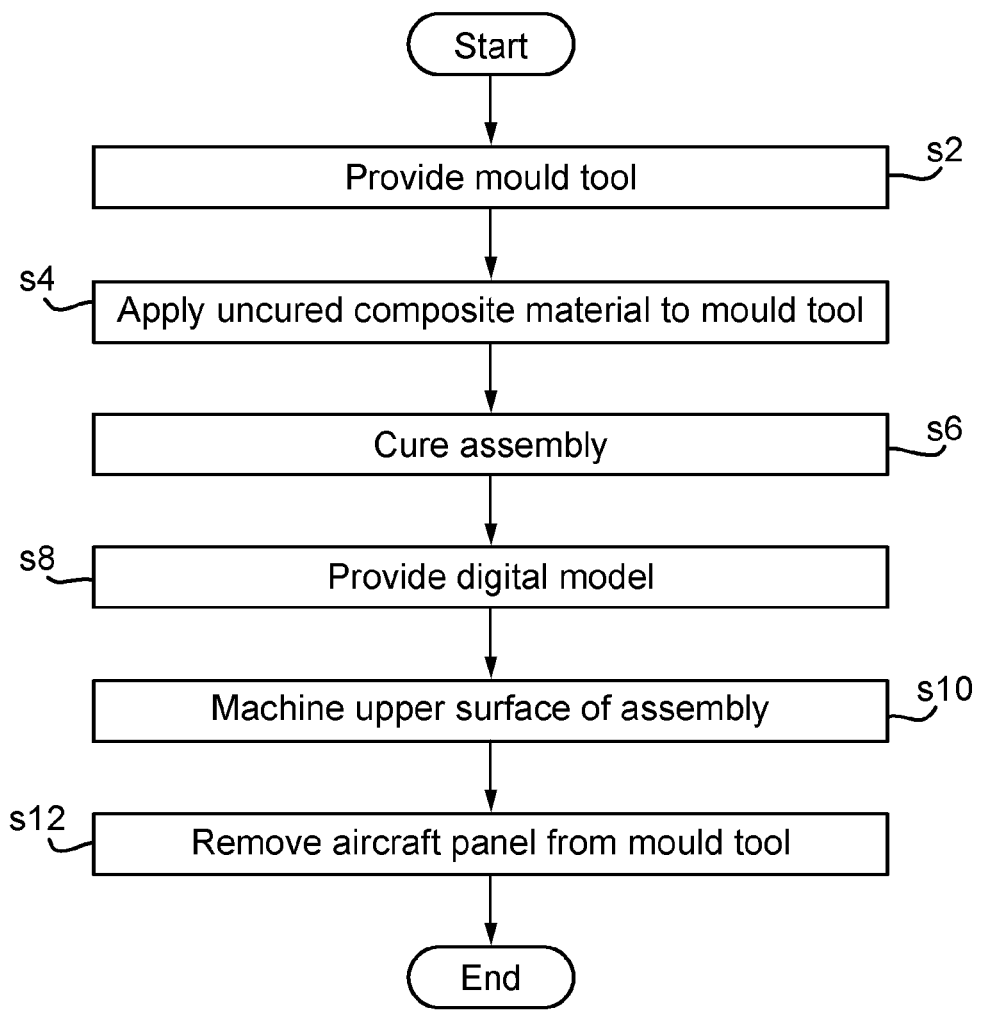
FIG. 2 is a process flow chart showing certain steps of an embodiment of a production process used to produce the aircraft panel.

FIG. 2 is a process flow chart showing certain steps of an embodiment of a production process used to produce the aircraft panel 2.

At step s2, a mould tool is provided. The mould tool will be described in more detail later below with reference to FIG. 3.

At step s4, uncured composite material (in particular, multiple sheets of pre-impregnated composite fibres including a matrix material such as epoxy) is laid against an upper surface of the mould tool and secured to the upper surface of the mould tool so as to form an assembly.

Figure 3:
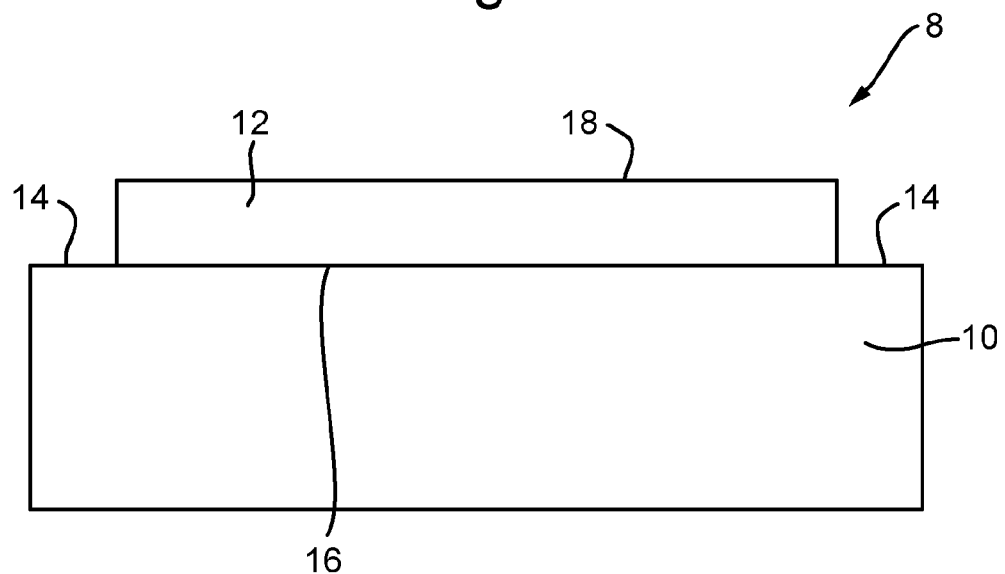
FIG. 3 is a schematic illustration (not to scale) showing a side view of an apparatus including a mould tool.

FIG. 3 is a schematic illustration (not to scale) showing a side view of the assembly 8 which comprises a mould tool 10 and the uncured composite material 12.

In this embodiment, the mould tool 10 is a substantially rigid structure made of metal. The mould tool 10 may have substantially the same thermal expansion properties as the object to be cured (i.e. the uncured composite material 12). An upper surface 14 of the mould tool 10 is a mould surface that defines the shape of the aircraft panel 2 being produced. In particular, the upper surface 14 of the mould tool 10 has a contour that is the same as the desired OML of the aircraft part to be produced using the aircraft panel 2. In other words, the upper surface 14 of the mould tool 10 is the same shape as the desired shape of the upper surface 6 of the final aircraft panel 2.

The mould tool 10 may have been produced using any appropriate process, and may have been produced using a digital model of the aircraft part so as to provide that the upper surface 14 of the mould tool 10 is the same shape as the desired OML.

A lower surface 16 of the uncured aircraft panel 12 is in contact with the upper surface 14 of the mould tool 10.

The uncured composite material 12 is fixedly secured against the upper surface 14 of the mould tool 10. This may be achieved by any appropriate means, for example, by a non-permeable membrane (not shown in the Figures) that is tightly drawn over the upper surface of the assembly 8 into intimate contact with the upper surface 18 of the uncured composite material 12, such that the uncured composite material 12 is sandwiched between the upper surface 14 of the mould tool 10 and the membrane. The membrane may be forced against the upper surface 18 of the uncured composite material 12 by establishing a vacuum within the chamber defined by the membrane and the upper surface 14 of the mould tool 10, for example, via a bore through the mould tool 10 having an opening at the upper surface 14 of the mould tool 10.

At step s6, the assembly 8 is placed into an autoclave, and the autoclave is controlled such that a cure cycle is run. Thus, the assembly is heated, and the uncured composite material 12 is cured (said material will hereafter be referred to as the cured composite material).

During the curing process, the lower surface 16 of the uncured aircraft panel 12 is moulded against the upper surface 14 of the mould tool 10. Thus, the lower surface 16 is moulded into the same shape as the desired OML so as to form the upper surface 6 of the final aircraft panel 2.

After curing, the assembly is removed from the autoclave.

At step s8, a digital model specifying the final aircraft panel 2 is provided for use by a controller of a computer numerically controlled (CNC) router, i.e. a computer controlled cutting machine.

At step s10, the controller controls the CNC router to machine the upper surface of the cured composite material in accordance with the digital model specifying the final aircraft panel.

Figure 4:
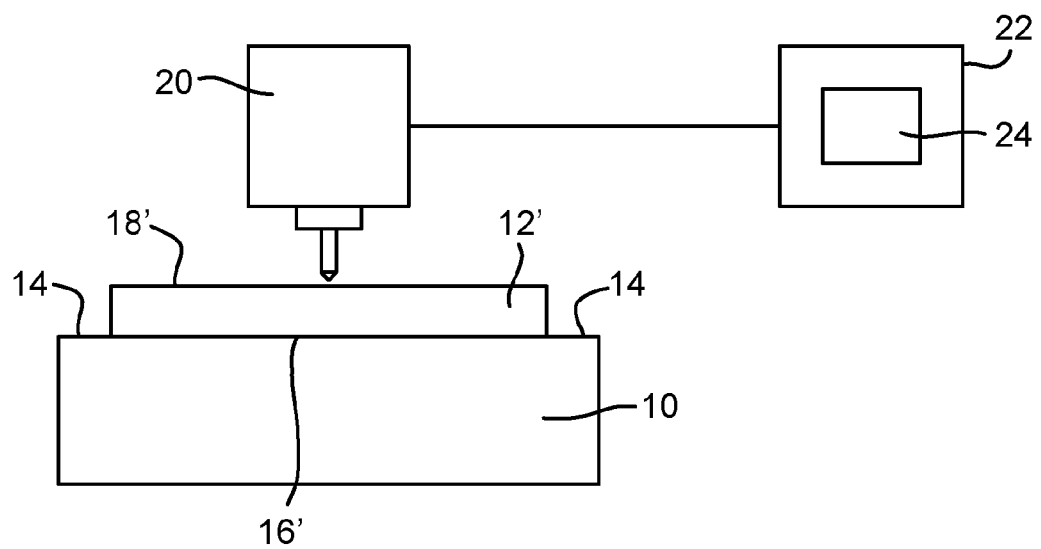
FIG. 4 is a schematic illustration (not to scale) illustrating a machining process.

FIG. 4 is a schematic illustration (not to scale) illustrating the machining apparatus used to machine the cured composite material 12'. In this embodiment, the machining apparatus comprises the CNC router 20 which is controlled by the processor 22 using the digital model 24 of the aircraft panel 2 to be produced.

The digital model 24 specifies the lower surface 4 of the final aircraft panel 2 relative to the upper surface 6 of the final aircraft panel 2. The upper surface 6 of the final aircraft panel 2 as defined by the digital model 24 is a datum relative to which the lower surface 4 of the final aircraft panel 2 is specified.

As described above, the upper surface 14 of the mould tool 10 is the same shape as the desired OML of the aircraft part to be produced using the aircraft panel 2. Thus, a lower surface 16' of the cured composite material 12', which has been moulded against the upper surface 14 of the mould part 10, is the same shape as the desired OML. Thus, the upper surface 14 of the mould tool 10 and the lower surface 16' of the cured composite material 12' are the same shape as the upper surface 6 of the final aircraft panel 2 as defined by the digital model 24.

In this embodiment, machining process is performed as follows.

Firstly, the processor 22 moves the CNC router 20 such that the CNC router 20 is located itself against the upper surface 14 of the mould tool 10 (or some other point on the mould tool 10 with a known position relative to the upper surface 14 of the mould tool 10). In this way, the processor 22 determines the position of the CNC router 20 with respect to the upper surface 14 of the mould tool 10.

Secondly, the processor 22 defines the position of the datum defined in the digital model 24 (i.e., the upper surface 6 of the final aircraft panel 2 as defined by the digital model 24) to be the same as the real-word position of the upper surface 14 of the mould tool 10. Thus, the position of the CNC router 20 with respect to the datum defined by the digital model 24 is known by the processor 22.

Thirdly, the processor 22 controls the CNC router 20 to machine the upper surface 18' of the cured composite material 12' such that the upper surface 18' of the cured composite material 12' has the same shape, position, and orientation, relative to the datum, as the lower surface 4 of the final aircraft panel 2, as defined in the digital model 24. In other words, the upper surface 18' of the cured composite material 12' is machined such that the shape of the upper surface 18' of the cured composite material 12', relative to the upper surface of the mould tool 14 (which is coincident with the lower surface 16' of the cured composite material 12'), is the same as the shape of the lower surface 4 of the final aircraft panel 2 relative to the upper surface 6 of the final aircraft panel 2 as defined in the digital model 24.

Thus, the cured composite material 12' is machined into the shape of the final aircraft panel 2.

In some embodiments, the mould tool 10 includes a plurality of tooling balls (or other appropriate structures). A tooling ball is precision ground reference structure that may be used as a reference point during machining operations, and other processes including but not limited to a critical inspection process. The tooling balls define a datum with respect to which machining and inspection processes may be carried out.

Preferably, the tooling balls are attached to the mould tool 10 at or proximate to the upper surface 14 of the mould tool 10. The relative positions of the tooling balls and the upper surface 14 of the mould tool 10 may be known to the processor 22.

The process of locating the CNC router 20 against the mould tool 10 may comprise locating the CNC router 20 against each of the tooling balls. The machining process comprises the CNC router locating against (i.e. contacting with) a tooling ball, and from this "zero position", moving to and machining the upper surface 18' of the cured composite material 12'. The digital model for the aircraft panel 2 may be defined with respect to the datum defined by the tooling balls. During the machining process, the CNC router 20 may periodically locate itself against the tooling balls to ensure that the cured composite material 12' is accurately machined with respect to the digital model and the datum.

During the machining process, the cured composite material 12' is fixedly secured against the upper surface 14 of the mould tool 10. Thus, the mould tool 10 is a machining fixture in addition to being a mould tool. The holding of the cured composite material against the upper surface 14 of the mould tool 10 may be achieved by any appropriate means. In some embodiments, after the composite material is cured at step s6, for example, the non-permeable membrane used to force the composite material against the upper surface 14 of the mould tool 10 during the curing process is removed, and the position of the cured composite material 12' relative to the mould tool 10 is maintained in such a way that access to the upper surface 18' of the cured composite material 12' by the CNC router 20 is permitted (i.e. not impinged by the retaining means). Examples of retaining means by which the cured composite material 12 may be retained against the upper surface of the mould tool include, but are not limited to, clamps for clamping the cured composite material 12' to the mould tool 10, an adhesive for adhering the cured composite material 12' to the mould tool 10, or by establishing a vacuum between the mould tool 10, and the cured composite material 12', for example, via a bore through the mould tool 10 having an opening at the upper surface 14 of the mould tool 10.

The cured composite material may be secured against the mould tool during machining in any appropriate way, including but not limited to, one or more clamps, an adhesive, and a vacuum established between the mould tool and the cured composite material.

At step s12, the machined cured composite material, i.e. the produced aircraft panel 2, is removed from the mould tool 10.

Thus, the aircraft panel 2 production process is provided.

The above described process of producing an aircraft panel having desired tolerances tends to be more efficient and cost effective that conventional methods.

In some conventional methods, layers of composite material are cured to produce an initial aircraft panel. The initial aircraft panel is inspected and further layers of composite material are added to the initial aircraft panel where additional thickness is required. The initial panel and added layers are re-cured to produce a modified aircraft panel. The inspection, the adding of layers, and the re-curing processes are iteratively performed until the aircraft panel is within desired tolerances. This process tends to be relatively imprecise and time-consuming as the change in size of composite material during curing tends to vary and typically cannot be accurately predicted. The above described method and apparatus advantageously tends to avoid having to perform this iterative process. Furthermore, the above described method is a subtractive production process that advantageously avoids problems typically encountered during conventional additive production processes, such as those caused by the unpredictability of the amount by which the thickness of a layer of composite material may vary during curing.

In some conventional methods, an initial aircraft panel is produced and attached to an airframe to produce an aircraft part. The OML of the aircraft part is then measured and filler material, for example liquid shim, is applied between the initial aircraft panel and the airframe so as to fill gaps between the initial aircraft panel and the airframe and to provide the desired OML. This is typically a time-consuming and costly process. The above described subtractive production process advantageously tends to reduce or eliminate the gap filling process.

Advantageously, the above described mould tool is used both to mould the composite material and as a machining fixture during a machining process. Thus, a need for a separate mould tool and machining fixture tends to be avoided.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

Apparatus, including the processor for controlling the routing apparatus, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

What is claimed is:

1. A method of producing an object, the method comprising:
   providing a mould tool having a mould surface;
   applying uncured composite material to the mould surface of the mould tool so as to form an assembly;
   curing the assembly so as to cure the uncured composite material and mould the uncured composite material against the mould surface, thereby producing cured composite material having a moulded lower surface that is substantially the same shape as and contiguous with the mould surface;
   providing a digital model of at least part of the object to be produced, wherein:
      the digital model specifies a first surface of the object to be produced, an opposing second surface of the object to be produced, and a position of the second surface relative to the first surface; and
      the first surface is substantially the same shape as the mould surface; and
   while maintaining the position of the cured composite material relative to the mould surface, machining, by a router, using the digital model, a machined upper surface of the cured composite material, said machined upper surface being opposite to said moulded lower surface, thereby producing the object; wherein
   the cured composite material is machined in such a way that:
      the machined upper surface of the cured composite material is substantially the same shape as the second surface, and
      the position of the machined upper surface of the cured composite material relative to the moulded lower surface is substantially the same as the position of the second surface relative to the first surface.

2. The method according to claim 1, wherein the object is an aircraft panel for forming at an external skin of at least part of an aircraft.

3. The method according to claim 2, wherein the first surface is an inner mould line of the at least part of the aircraft or an outer mould line of the at least part of the aircraft.

4. The method according to claim 3, wherein:
   if the first surface is an inner mould line of the at least part of the aircraft, the second surface is an outer mould line of the at least part of the aircraft; and
   if the first surface is an outer mould line of the at least part of the aircraft, the second surface is an inner mould line of the at least part of the aircraft.

5. The method according to claim 1, wherein the step of machining comprises:
   measuring a location of the mould surface of the mould tool;
   defining, as a datum, the measured location of the mould surface;
   locating the router against at least part of the mould tool, thereby moving the router into a known position with respect to the datum; and
   controlling the router with respect to the datum to machine the cured composite material.

6. The method according to claim 5, wherein the step of machining comprises defining a location of the first surface of the digital model to be at the datum, thereby specifying a location of the second surface relative to the datum.

7. The method according to claim 5, wherein:
   the mould tool comprises a plurality tooling balls, each tooling ball having a fixed position relative to the mould surface; and
   the step of measuring a location of the mould surface comprises measuring relative locations of the tooling balls; and
   the step of locating the router against at least part of the mould tool comprises locating the router against a tooling ball.

8. The method according to any of claims 1 to 7, wherein the uncured composite material is a plurality of pre-impregnated sheets comprising composite fibres and a matrix material.

9. The method according to claim 1, the method further comprising, during the curing of the assembly, forcing the composite material against the mould surface of the mould tool by applying a membrane over a surface of the assembly such that the composite material is sandwiched between the mould tool and the membrane, and establishing a vacuum within a chamber defined by the membrane and the mould tool.

10. The method according to claim 1, wherein during the machining of the cured composite material, the cured composite material is retained against the mould tool by retaining means selected from the group of retaining means consisting of: one or more clamps; adhesive; and a vacuum established between the mould tool and the cured composite material.

11. The method according to claim 1, wherein the mould tool has substantially the same thermal expansion properties as the composite material.

\* \* \* \* \*